United States Patent [19]

Roderick et al.

[11] 4,233,085
[45] Nov. 11, 1980

[54] SOLAR PANEL MODULE

[75] Inventors: Guy A. Roderick; Peter Locke, both of El Paso, Tex.

[73] Assignee: Photon Power, Inc., El Paso, Tex.

[21] Appl. No.: 22,418

[22] Filed: Mar. 21, 1979

[51] Int. Cl.$^2$ ............................................. H01L 31/04
[52] U.S. Cl. ..................................... 136/244; 136/251
[58] Field of Search ............ 136/89 P, 89 EP, 89 TP, 136/89 CD; 250/239

[56] References Cited

U.S. PATENT DOCUMENTS

| | | | |
|---|---|---|---|
| 3,880,633 | 4/1975 | Jordan et al. | 65/60 |
| 4,084,985 | 4/1978 | Evans, Jr. | 136/89 P |
| 4,167,644 | 9/1979 | Kurth et al. | 136/89 EP |

OTHER PUBLICATIONS

P. S. Masser et al., "Fixed Angle & Seasonably Adjustable Structural Support Concepts for Solar Converters", *Conf. Record, 13th IEEE Photovoltaic Specialists Conf.*, pp. 1084–1089 (1978).
Optical Coating Laboratory Product Literature "Standard 20-Watt Terrestrial Solar Module" Part No. 60-3017 (Issued 1978).

*Primary Examiner*—Aaron Weisstuch
*Attorney, Agent, or Firm*—Bard & Groves

[57] ABSTRACT

A solar panel module is provided, wherein a plurality of solar panel units are electrically interconnected and supported within a low cost frame assembly, which may conveniently be formed from wood products. Each solar panel unit is provided with extending conductors for electrical connections with adjacent solar panels. Each solar panel unit is formed in a back-wall configuration where solar radiation is incident on a transparent vitreous substrate. The panel surface opposite the substrate is sealed, preferably with a bituminous material, to minimize permeation of the solar panel by environmental elements. The sealing material cooperates with the frame to provide an insulated exposed surface. In one embodiment, the completed module is formed to external dimensions generally standard in the building industry for easy installation.

16 Claims, 4 Drawing Figures

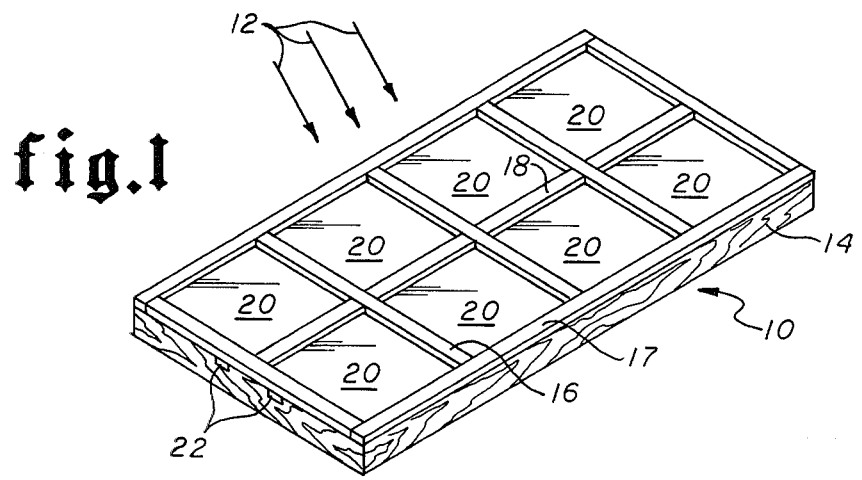
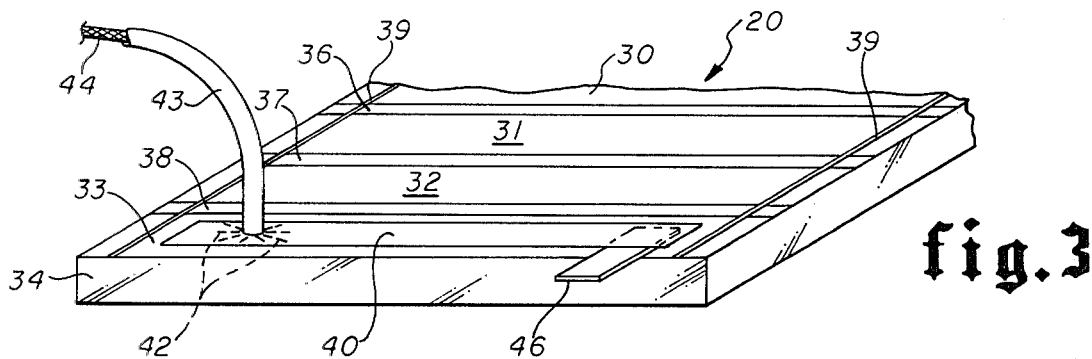
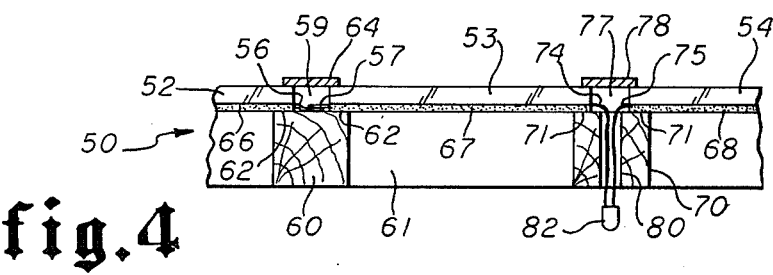

SOLAR PANEL MODULE

BACKGROUND OF THE INVENTION

This invention relates to photovoltaic devices for producing usable amounts of electrical energy from incident solar radiation and, more particularly, to the assembly of discrete photovoltaic panels into insulated, sealed frame structures.

Extensive research effort is currently being expended to develop mass production capabilities for photovoltaic cells producing electrical energy from incident solar radiation. Two basic technologies are evolving: one dealing with silicon materials, and another dealing with polycrystalline thin films. A major advantage to the thin films is that an effective photovoltaic cell may be formed from a polycrystalline film produced by production techniques adaptable to large volume operations.

A particularly desirable polycrystalline thin film may be formed from cadmium sulfide although suitable films may be formed generally from compounds of elements in Groups II B and VI A of the periodic table. As used herein, the term cadmium sulfide-type cell refers to a photovoltaic cell incorporating any of these compounds.

U.S. Pat. Nos. 3,880,633, 4,086,101, and 4,104,420, all to Jordan and Lampkin, teach processes for forming a large area photovoltaic panel having a glass substrate with a transparent electrically conductive coating of tin oxide, a layer of polycrystalline cadmium sulfide covered by a heterojunction-forming layer of cuprous sulfide, and overlying conductive materials. U.S. Patent application No. 831,544 further shows a series connected array of photovoltaic cells formed from such a photovoltaic panel.

As hereinbelow used, a photovoltaic or solar panel unit refers to an array of cadmium sulfide-type photovoltaic cells on a common substrate. In a preferred embodiment, the photovoltaic cells are formed according to teachings of the above patents and patents applications and connected in a series configuration by exposed layers of metallic conductors. The cells thus formed are in a back-wall configuration, wherein the activating solar irradiation is incident on the glass substrate and must pass through the layer of cadmium sulfide prior to reaching the heterojunction. The resulting photovoltaic panels are fragile and should desirably be provided with a frame to facilitate handling and installation in an overall power producing network.

In the prior art which was concerned with packaging silicon cells, hermetically sealed enclosures were needed to protect the silicon from atmospheric contamination or the silicon was embedded in a surrounding plastic. Early cadmium sulfide-type photovoltaic cells were generally small and were assembled in interconnected arrays much as the monocrystalline silicon cells were assembled.

One producer of photovoltaic panels, SES, Inc., provides a standard panel which is nominally 8 inches square and is hermetically sealed to protect the cell interconnections. A plurality of these panels are formed into a modular array by plugging the hermetically sealed panels into a frame assembly. This frame assembly has been manufactured of metallic materials and requires interconnecting wiring with such corrosion resistant conductors as gold plated contact surfaces.

One of the main obstacles to large scale use of photovoltaic solar energy conversion devices is the large cost per installed watt of presently available devices. A high percentage of the cost is derived from the need to provide hermetically sealed environments and elaborate frames for the photovoltaic cells and/or panels. The need for low fabrication costs is further dramatized when it is realized that a large potential market for low cost photovoltaics is the underdeveloped regions of the globe where central power distribution grids are simply not in existence.

The solar cell modules which are in the prior art are not capable of being installed and maintained in many areas of the world. A suitable photovoltaic module must be capable of remaining unattended for extended periods of time. Further, the photovoltaic assembly should preferably be safe with respect to some tampering by uneducated peoples. The present sophisticated photovoltaic packaging now available is not believed to be capable of meeting the above problems.

SUMMARY OF THE INVENTION

Low cost packaging of photovoltaic solar panels is provided. The solar panels selected for assembly have transparent vitreous substrates for receiving incident solar irradiation and for supporting a plurality of CdS-Cu$_2$S photovoltaic cells integrally formed on each substrate and preferably electrically connected in a series configuration by a conductive layer. Solar panel units are assembled in a frame in a quantity and configuration required to produce the desired module operating parameters.

It is desired that the assembled module be electrically insulated. The conductive layers on the solar panels are coated with an insulating film, which is preferably a bituminous material. The coated panels are cooperatively mounted in the frame assembly to provide an insulated exposed surface.

The frame is formed to provide a material adjacent the substrate having a hardness less than the hardness of the vitreous substrate for protectively supporting the solar panel. The frame is also weather resistant for prolonged exposure to environmental conditions.

It is an objective of the present invention to provide a low cost structure suitable for a photovoltaic solar panel.

Another objective is to provide an electrically insulated assembly of photovoltaic solar panels.

Yet another objective is to provide an assembly of solar panels whose electrical configuration can be easily altered.

One other objective is to provide a frame constructed of readily available materials and capable of field assembly.

An objective is to provide a frame assembly suitable for forming at least a portion of the shipping container for the module.

It is a feature of the present invention to provide a module of a plurality of solar panels, each having photovoltaic cells mounted on a common transparent vitreous substrate which receives incident solar radiation, and electrically connected by a conductive layer.

Another feature is to support the solar panels in a frame which is resistant to environmental exposure and provides a supporting surface for the substrate having a hardness less than the hardness of the vitreous substrate.

One other feature is to coat the conducting layer of the solar panel with an insulating film which cooperates with the frame to form an insulated surface for the assembled module.

These and other features and advantages of the present invention will become apparent from the following detailed description, wherein references are made to the figures in the accompanying drawings.

BRIEF DESCRIPTION OF THE DRAWINGS

FIG. 1 is an isometric drawing of an assembled solar panel module.

FIG. 2A is a schematic of a parallel series-connected arrangement.

FIG. 2B is a schematic of a series-connected arrangement.

FIG. 3 is an isometric drawing of extending conductors.

FIG. 4 is a cross-sectional view of interconnected solar panels.

DETAILED DESCRIPTION OF THE DRAWINGS

Referring now to FIG. 1, there is depicted one embodiment of solar panel module 10 constructed in accordance with the present invention. A plurality of photovoltaic solar panel units 20 are depicted, supported by frame 14 and electrically connected as hereinbelow discussed. Any gaps between adjacent solar panels 20 are sealed, which is accomplished in one embodiment by sealing strips 16, 17, and 18. Connector ports 22 are provided in a selected configuration for interconnecting solar module 10 with an electrical load or with other modules.

Solar radiation 12 is incident on the transparent vitreous substrate of solar panels 20. As hereinabove discussed, a preferred solar panel 20 has a plurality of cadmium sulfide-cuprous sulfide photovoltaic cells formed on a transparent electrically conductive film adhered to the vitreous substrate. An electrically conductive layer interconnects the individual cells into a series connected array. In one embodiment, the connected array produces about 22 volts open-circuit, with an operating voltage of about 18 volts. The state-of-the-art panels now produce up to about 4 watts and it is expected that near future panels will produce up to 10-11 watts. Thus, photovoltaic panel 20 is installed with the transparent vitreous substrate exposed to the incident irradiation and a conducting layer opposite the exposed surface. The transparent vitreous substrate may conveniently be glass, a substance well known for its weathering characteristics and easy maintenance.

Frame 14 is formed to support solar panel 20. Frame member 14 should accommodate contraction and expansion of solar panel 20 without introducing undue strains on the panel. Further, vitreous materials, such as glass, are easily damaged, and frame 14 desirably acts to hold the vitreous material without damaging it. Such a condition generally exists when at least the portion of frame 14 adjacent solar panel 20 has a hardness less than the hardness of the vitreous substrate of solar panel 20.

It is also desirable for frame 14 to form at least a portion of the shipping container for solar module 10. Such a double function acts to maintain a low cost for the installed module. Thus, a resilient material would be preferred to absorb impact forces and minimize substrate damage during shipment. Yet another desirable feature is for frame 14 to withstand prolonged exposure to environmental conditions. The theoretical life of the photovoltaic panel 20 is unlimited, although only a finite useful life is expected, and it is desired that the lifetime of the module not be limited by the frame itself. The frame 14 will be exposed and may be contacted by animals in the vicinity of the installation or by humans at various times. Foreign materials, such as moisture, introduced into the assembly might act to short circuit the frame to the solar panels 20 and frame 14 may desirably be insulated from the solar panel to prevent undue electrical shocks.

In a preferred embodiment, frame 14 is constructed of wood, such as cypress or redwood, which may be treated with preservatives by a variety of well known processes. Wood is lightweight, requires low maintenance, is available worldwide and may be fabricated by relatively unskilled persons using conventional fabrication techniques. The wood might be coated with a plastic to further prolong the life of the material or a metallic coating, such as aluminum, might be provided if it is found desirable to be able to ground the frame assembly.

Where a hard material, such as metal, forms the frame or coating for frame materials, the vitreous substrate may be more susceptible to damage. In this instance, a softer material, such as wood or plastic, is preferably provided to contact and support the solar panel unit 20 to protect the vitreous substrate. In a preferred embodiment, the frame assembly is sized to be compatible with construction standard modules, and may conveniently be the same size as a $4' \times 8'$ sheet of plywood.

Solar panel units 20 may be affixed in frame 14 by many well known techniques. In one embodiment, wood strips 16, 17 or 18 are fastened to frame 14 to extend over an edge portion of panel 20 to hold panel 20 within frame 14. Solar panel 20 should not be rigidly clamped but some flexibility permitted to accommodate thermal contraction and expansion. If desired, suitable sealants, such as available silicone compounds, may be used to seal about the edges of panels 20.

In another embodiment, panels 20 may be mounted flush with the upper surface of frame 14 by using suitable adhesives, such as silicon based compounds now available, to hold panels 20 in place. In this embodiment, the adhesive also serves to seal the surface of solar panels 20. It is desired that the entire exposed surface of panels 20 be sealed and relatively impervious to moisture penetrating to the rear surface of panels 20. Penetrating moisture could contact exposed conductor surfaces within module 10 and present a possible shock hazard.

Referring now to FIGS. 2A and 2B, there are schematically depicted two possible electrical configurations for solar panels 20. FIG. 2A depicts two parallel strings of four (4) solar panels 20 each where the four (4) solar panels 20 in each string are electrically connected in series. Thus, a first string is provided with terminals 24 and 26 for interconnecting with an external distribution circuit and a second set of terminals 25 and 27 for connecting with an external distribution circuit. The expected operating parameters for the arrangement shown in FIG. 2A are an open circuit voltage $V_{oc}=88$ volts, short circuit current $I_{sc}=1.70$ amps, and power output parameters of $V_p=72.0$ volts, $I_p=1.2$ amps, $P=86.4$ watts.

FIG. 2B presents an alternate configuration where eight (8) solar panels 20 are connected in a series arrangement to produce an output at terminals 24 and 27 for interconnecting with an external power distribution network. The parallel strings of panels 20 are interconnected at electrodes 26 and 25 to form the series arrangement. In this configuration, the module would obtain $V_{cc}=176.0$ volts, $I_{sc}=0.85$ amps, $V_p=144$ volts, $I_p=0.60$ amps, and $P=86.4$ watts. Thus, the same power output is expected with either arrangement although some minor variations may arise due to internal power loses.

It is desirable to provide an interconnecting arrangement which is unambiguous, i.e., where two connectors of like polarity cannot be placed together. In one embodiment, the electrical connections on each solar panel 20 are displaced from the center line of a panel 20 and equidistant therefrom. Thus, a single configuration enables the electrode interconnections shown in both FIGS. 2A and 2B. The solar panels 20 in FIG. 2B, having output terminals 25 and 27, have all been rotated 180° to form the series connected arrangement from the parallel arrangement shown in FIG. 2A.

The final electrical configuration selected for solar panels 20 is a function of the system requirements in which the solar module 10 (FIG. 1) is to be installed. Numerous interconnection arrangements are available to accommodate various voltage and current needs. It will be appreciated that the selection of eight (8) panels in the above discussion is somewhat arbitrary. However, the expected size of solar panel 20 is such that an eight (8) panel arrangement produces overall dimensions for solar panel module 10 which are compatible with standard construction industry panels, e.g. a $4'\times 8'$ sheet. For field installations, the total number of panels can be selected as a function of the particular field requirements.

Referring now to FIG. 3, there is depicted in a partial isometric representation two electrode attachments to solar panel 20. A photovoltaic solar panel now available from Photon Power, Inc. is depicted in FIG. 3. A plurality of photovoltaic cells 30, 31, 32 and 33 are shown and are formed on a common glass substrate 34. A completed panel typically has sixty (60) such photovoltaic cells, each integrally formed on substrate 34 and extending across the full width of substrate 34. The cells are electrically connected in series at locations 36, 37 and 38 by an overlying electrically conductive layer. Because of the particular manufacturing process, complete film separation may not be obtained at the edges of substrate 34 and isolation strips 39 are provided to electrically isolate the edge portions from the active portions of solar panel 20. Thus, an inactive area may be conveniently provided for mounting solar panel 20 in a frame assembly, although it is desired to minimize any such inactive area.

The end photovoltaic cell 33 of solar panel 20 may conveniently be selected for attaching extending electrodes to the solar panel 20. The extending electrodes are arranged to establish electrical contact with the overlying electrically conductive material. In one embodiment, an electrically conductive tape having an adhesive backing is affixed to the conductive layer and secures extending conductors, as hereinafter described. Suitable conductive tapes with adhesives compatible with the Photon Power, Inc. photovoltaic panel are available from the 3M Company. In one embodiment, a metallic tab 46, which may conveniently be copper, is secured against the overlying conductive layer by conducting tape 40. In another embodiment, an insulated wire 43 is provided. The wire strands are inserted through a hole in conductive tape 40 and spread over the surface of the conductive layer and held in place by conducting tape 40. An exposed conductor portion 44 of wire 43 is provided for interconnecting with adjacent solar panels 20.

After the selected conductors have been affixed to photovoltaic panel 20, the panel is installed in a frame 50, such as shown in FIG. 4. Frame 50 may conveniently consist of side members 61 and cross members 60 and 70 which may be notched to support solar panels 52, 53 and 54. In one arrangement, solar panels 52, 53 and 54 are flush with the upper surface of side member 61 so that installation of hold down strips 64 and 78 will not rigidly clamp the solar panels 52, 53 and 54. If panels 20 are adhesively affixed, hold down strips 64 and 78 are not required.

In yet another embodiment, side member 70 and cross members 60 and 70 may be milled to define grooves for receiving solar panel 20. Then, the hold down members 64 and 78 would be integral with support members 60 and 70. During installation, the panels 20 would be inserted in the grooves and side members, such as strip 17 shown in FIG. 1, are attached to hold the panel 20 in place.

In one electrode interconnection arrangement, cross member 60 defines a cutout 59 for receiving conductor strips 56 and 57 from solar panels 52 and 53, respectively. The conducting tabs are in electrically conductive relationship and may also be soldered together to enhance the electrical contact. If desired, the cutout portion 59 of cross member 60 may be filled with an insulating material, such as a silicone compound to prevent moisture penetration and contact with electrical conductors 56 and 57.

If wire-type conductors are used, cross member 70 may define a cutout portion 77 and a hole 80 extending downwardly through the cutout portion 77. Wire conductors 74 and 75 from solar panels 53 and 54, respectively, are inserted through the hole for convenient access and interconnected with a commercially available connector 82. A variety of suitable connectors are available wherein the connector forms a sealed contact capable of prolonged environmental exposure once the connection is completed. In this configuration, the completed connection may be recessed back into hole 80 and cutout 77 and hole 80 may be filled with suitable sealing and insulating materials.

It will be appreciated that the location and configuration of the various means for accommodating electrode interconnections are a function of the specific panel 20 configuration desired. It is intended that the present invention include any of these arrangements.

Referring again to FIG. 4, it may be seen that solar panels 52, 53 and 54 have a suitable insulating film 66, 67 and 68, respectively, applied to the conductive surface area opposing the surface receiving incident solar radiation. Insulating films 66, 67 and 68 cooperate with frame 50 to provide an insulating surface for the completed solar panel module. Thus, accidental contact with the completed module by animals or humans will not result in harmful electrical shocks. If the frame is also an insulating material, the surface cannot be grounded and care must be taken to insure that all electrically conductive areas are properly sealed to prevent any possible hazard from accumulated moisture. A further advantage of an ungrounded, insulated structure is a reduced likelihood of damage due to lightning strikes.

The insulating films also serve to further seal the underlying films of the solar panels to exclude moisture and air. This exclusion acts to preclude permeation of the film structure by contaminants which have a long term degrading effect on heterojunction performance.

In accordance with one embodiment of the present invention, a low cost, easily applied material is selected to form the insulating film. In particular, a bituminous material may be selected to form the insulating film. Such materials are easily applied by a variety of coating processes, such as dip, brush or roller, or spray, and may be easily reapplied at any time during the lifetime of the operating photovoltaic cell. It has been found that a bituminous layer thickness of 0.002–0.030 inch provides adequate insulation and resistance to environmental contamination resistance.

Bituminous materials, such as asphalt and tar, are particularly suitable and readily available throughout the world. In one embodiment, an asphalt-clay emulsion, provided by Chemrex under batch number 24683, is used to coat the conductive surface. Although the solar panels are desirably coated prior to installing in frame 50, the entire frame may be assembled and the surface area opposite the irradiated surface area coated with the suitable material.

The final material chosen for the insulating surface may be selected based on a variety of considerations, such as low cost and ready availability as hereinabove set forth. In some circumstances, it may be desirable to select a material which assists in reducing the operating temperature of the overlying solar panels where the operating temperatures exceed the desirable operating limits for the heterojunction materials. In such cases, a black surface, such as provided by tar and asphalt, serves as a black body radiator to transfer heat from the solar panel.

Thus, it may be seen from the above description that a unique low cost photovoltaic solar module is provided which is capable of being shipped and installed at virtually any known location. The employment of low cost and readily available materials enables maximum deployment of the solar module at inaccessible locations and even fabrication of the frame assembly at remote locations by relatively unskilled labor if it is desired to merely ship solar panels to such locations. Further, minor repairs can be readily done on the completed assembly.

Although the above description primarily concerns a plurality of photovoltaic panels mounted to form a module, it will be appreciated that a single panel may have utility for many purposes. Such a single panel is contemplated to be within the scope of this disclosure and may be easily obtained by providing a single panel support structure in accordance with the above teachings.

Numerous variations and modifications may obviously be made in the structure hereindescribed without departing from the present invention. Accordingly, it should be clearly understood that the forms of the invention herein described and shown in the figures of the accompanying drawings are illustrative only and are not intended to limit the scope of the invention.

What is claimed is:

1. Apparatus forming a solar panel module from a plurality of solar panel units each with a transparent vitreous substrate having a first surface adapted for receiving incident solar radiation and a second opposite surface supporting a plurality of CdS-type photovoltaic cells in a back-wall configuration electrically interconnected by an outer conductive layer, comprising:

a frame assembly resistant to environmental exposure and defining surfaces for supporting edge portions of said substrate;
means flexibly securing said solar panel units on said support surfaces; and
an electrically insulating film disposed over said outer conductive layer of each said solar panel unit,
said frame and said insulating frame cooperating to form an insulated mounting for each solar panel unit of said module.

2. Apparatus described in claim 1, further including:
connector means for electrically interconnecting adjacent ones of said solar panel units in a configuration effective to obtain selected module output parameters.

3. Apparatus described in claim 2, wherein said connector means are spaced apart from the centerline of each said solar panel units to provide unambiguous panel interconnections.

4. Apparatus described in anyone of claims 1, 2 or 3 wherein said electrically insulating film is formed of a bituminous material.

5. Apparatus described in claim 4, including means for sealingly securing said solar panel units in said frame against moisture penetration.

6. Apparatus described in anyone of claims 1, 2, or 3, further including means for sealingly securing said solar panels in said frame against moisture penetration.

7. An improved photovoltaic panel comprising a plurality of CdS-type photovoltaic cells in a back-wall configuration on a transparent vitreous substrate and interconnected by an outer conductive layer, the improvement comprising:
a bituminous layer contacting said outer conductive layer to a depth effective to seal said photovoltaic cells from environmental contaminants and to form an insulated external surface adjacent said conductive layer.

8. Apparatus forming a solar panel module from a plurality of solar panel units each with a transparent vitreous substrate having a first surface adopted for receiving incident solar radiation and a second opposite surface supporting a plurality of CdS-type photovoltaic cells in a back-wall configuration and electrically interconnected by an outer conductive layer, comprising:
a wooden frame assembly defining surfaces for supporting edge portions of said solar panel units;
means flexibly securing said solar panel units on said support surface; and
an electrically insulating film disposed over said outer conductive layer of said solar panel,
said frame and said insulating film cooperating to form an insulated mounting for each solar panel unit of said module.

9. Apparatus described in claim 8, further including:
connector means for electrically interconnecting adjacent ones of said solar panel units in a configuration effective to obtain selected module output parameters.

10. Apparatus described in claim 9, wherein said connector means are spaced apart from the centerline of each said solar panel units to provide unambiguous panel interconnections.

11. Apparatus described in anyone of claims 8, 9, 10 wherein said electrically insulating film is formed of a bituminous material.

12. Apparatus described in claim 11, including means for sealinging securing said solar panel units in said frame against moisture penetration.

13. Apparatus described in anyone of claims 8, 9, or 10, further including means for sealingly securing said solar panel units in said frame against moisture penetration.

14. Apparatus forming a solar panel module, comprising:
- a plurality of solar panel units each with a single transparent vitreous panel having a first surface adapted for receiving incident solar radiation and a second opposing surface structurally supporting a plurality of interconnected photovoltaic cells;
- a frame assembly resistant to environmental exposure and defining surfaces for supporting edge portions of said transparent vitreous panels;
- means flexibly securing said solar panel units on said support surfaces; and
- an electrically insulating film disposed over said interconnected photovoltaic cells of each said solar panel units;
- said frame and said insulating film cooperating to form an insulating mounting for each said solar panel unit of said module.

15. Apparatus described in claim 14, wherein said frame assembly is constructed of a wooden material.

16. Apparatus described in any one of claims 14 and 15, further including
- connector means spaced apart from the centerline of each said panel unit for providing unambiguous electrical interconnections between adjacent ones of said solar panel units.

* * * * *

UNITED STATES PATENT AND TRADEMARK OFFICE
CERTIFICATE OF CORRECTION

PATENT NO. : 4,233,085

DATED : November 11, 1980

INVENTOR(S) : Guy A. Roderick and Peter Locke

It is certified that error appears in the above-identified patent and that said Letters Patent are hereby corrected as shown below:

Col. 8, line 8, "frame" (second occurrence) should be --film--.

Signed and Sealed this

Fifth Day of May 1981

[SEAL]

Attest:

RENE D. TEGTMEYER

Attesting Officer     Acting Commissioner of Patents and Trademarks